(12) United States Patent
Kataoka et al.

(10) Patent No.: US 8,863,792 B2
(45) Date of Patent: Oct. 21, 2014

(54) FILLING PORT STRUCTURE FOR FUEL TANK

(75) Inventors: Chiaki Kataoka, Nagakute (JP); Satoshi Yamamoto, Nagoya (JP); Masaki Akagi, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 301 days.

(21) Appl. No.: 13/485,263

(22) Filed: May 31, 2012

(65) Prior Publication Data
US 2012/0312420 A1  Dec. 13, 2012

(30) Foreign Application Priority Data

Jun. 10, 2011  (JP) .................................. 2011-130273

(51) Int. Cl.
*B60K 15/04* (2006.01)
(52) U.S. Cl.
CPC ......... *B60K 15/04* (2013.01); *B60K 2015/0483* (2013.01)
USPC .......................................... 141/350; 220/86.2
(58) Field of Classification Search
CPC ............................. B60K 15/04; B60K 15/0403
USPC .......................... 141/348–350; 220/86.2–86.3
See application file for complete search history.

(56) References Cited

U.S. PATENT DOCUMENTS 3,730,216 A *  5/1973  Arnett et al. .................. 137/588
4,034,784 A *  7/1977  Ball et al. ...................... 141/348

7,048,020 B2 *  5/2006  Durieux et al. ................ 141/382
7,077,178 B2 *  7/2006  Hedevang ...................... 141/367
7,182,111 B2 *  2/2007  McClung et al. ............. 141/352
7,293,586 B2 * 11/2007  Groom et al. ................. 141/350
7,302,977 B2 * 12/2007  King et al. .................... 141/367
7,661,550 B2 *  2/2010  Feichtinger .................. 220/86.2
7,665,493 B2 *  2/2010  Groom et al. ................. 141/350
7,967,041 B2 *  6/2011  Groom et al. ................. 141/367
7,967,042 B2 *  6/2011  Groom et al. ................. 141/367
8,191,588 B2 *  6/2012  Hagano ......................... 141/350
8,539,993 B2 *  9/2013  Hagano ......................... 141/350

(Continued)

FOREIGN PATENT DOCUMENTS

AT         009 945 U1   6/2008
DE  10 2009 009 998 A1   8/2010

(Continued)

OTHER PUBLICATIONS

Sep. 25, 2012 Extended European Search Report issued in European Patent Application No. 12171046.1.

*Primary Examiner* — Nicolas A Arnett
(74) *Attorney, Agent, or Firm* — Oliff PLC

(57) ABSTRACT

A filling port structure for a fuel tank includes a filling port member that defines a filling port, an open/close valve that opens and closes the filling port, a rotary member that attaches the open/close valve to the filling port member in a manner such that the open/close valve is rotatable between an open position and a closed position, a locking member that is provided in the filling port member and is movable between a locking position to lock the open/close valve in the closed position and an unlocking position to unlock the open/close valve, an unlocking member that moves the locking member to the unlocking position when pressed by a fuel gun, and a retention portion that holds the locking member in the unlocking position at least when the open/close valve is in the open position.

6 Claims, 8 Drawing Sheets

(56) References Cited

U.S. PATENT DOCUMENTS

| | | | |
|---|---|---|---|
| 8,714,214 B2 * | 5/2014 | Cisternino | 141/350 |
| 8,726,950 B2 * | 5/2014 | Miller et al. | 141/350 |
| 2006/0032552 A1 * | 2/2006 | Hedevang | 141/367 |
| 2006/0096662 A1 * | 5/2006 | King et al. | 141/367 |
| 2006/0289084 A1 * | 12/2006 | Groom et al. | 141/367 |
| 2007/0034287 A1 * | 2/2007 | Groom et al. | 141/350 |
| 2008/0237231 A1 | 10/2008 | Feichtinger | |
| 2009/0020182 A1 * | 1/2009 | Groom et al. | 141/349 |
| 2009/0165891 A1 * | 7/2009 | Candelise | 141/346 |
| 2010/0218849 A1 | 9/2010 | Hagano | |
| 2011/0315682 A1 | 12/2011 | Tsiberidis | |
| 2013/0193140 A1 * | 8/2013 | Hagano et al. | 220/86.2 |
| 2013/0327768 A1 * | 12/2013 | Kataoka et al. | 220/86.2 |
| 2013/0341326 A1 * | 12/2013 | Sasaki | 220/203.06 |

FOREIGN PATENT DOCUMENTS

| | | |
|---|---|---|
| EP | 1 690 727 A2 | 8/2006 |
| JP | A-2008-049952 | 3/2008 |
| WO | WO 2008/032347 A1 | 3/2008 |
| WO | WO 2010/094508 A2 | 8/2010 |

* cited by examiner

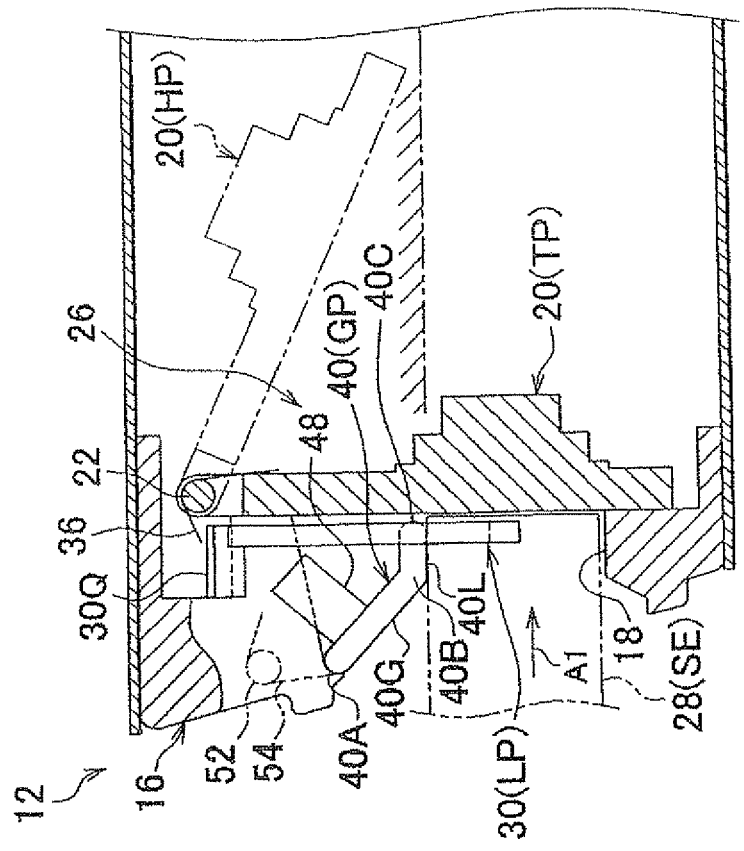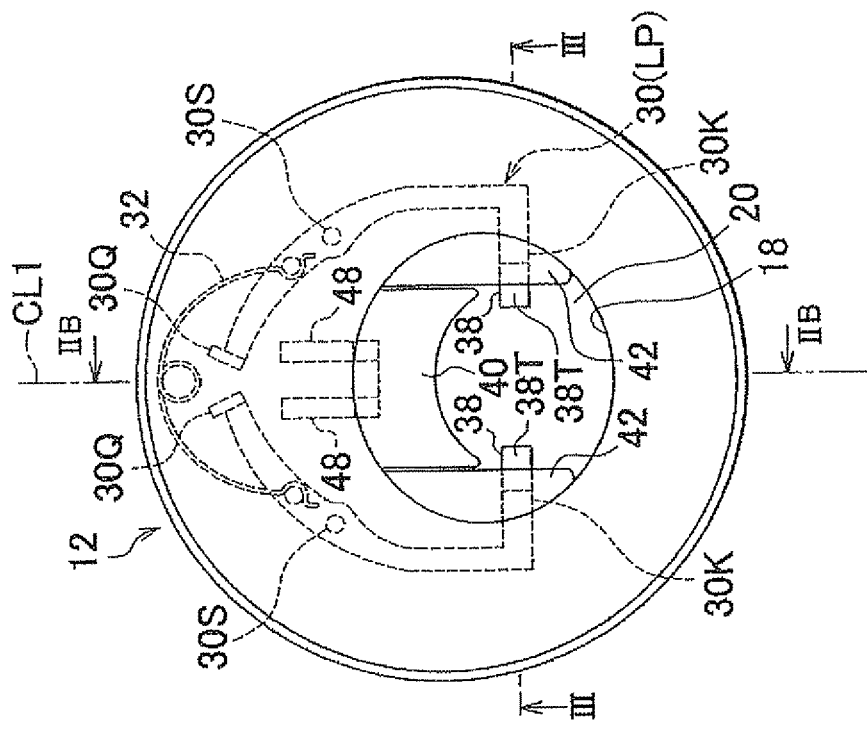

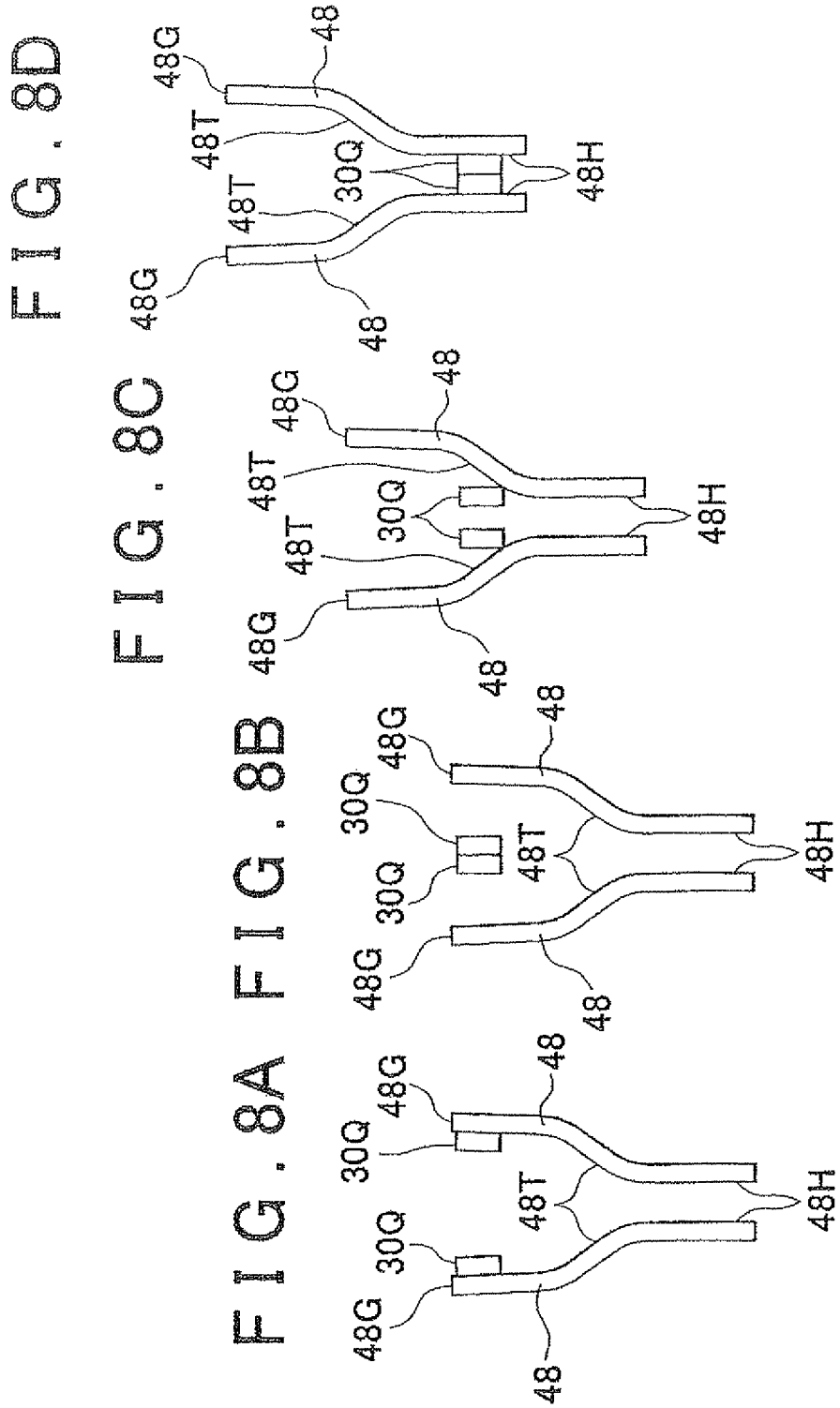

FILLING PORT STRUCTURE FOR FUEL TANK

INCORPORATION BY REFERENCE

The disclosure of Japanese Patent Application No. 2011-130273 filed on Jun. 10, 2011 including the specification, drawings and abstract is incorporated herein by reference in its entirety.

BACKGROUND OF THE INVENTION

1. Field of the Invention The present invention relates to a filling port structure for a fuel tank.
2. Description of Related Art
A filling port structure for a fuel tank of an automobile that includes an open/close valve, such as a flap valve, which can open and close the filling port into which a fuel nozzle is inserted is known. For example, Japanese Patent Application Publication No. 2008-49952 (JP 2008-49952 A) discloses a structure which includes an opening/closing member (flap valve) that is provided with a lock member which is unlocked when a lock releasing part is pressed by a fuel nozzle with a specific diameter.

However, in the structure that is disclosed in JP 2008-49952 A, a part of the lock member protrudes into a fuel gun insertion region (inside the filling port) and may interfere with a fuel gun that is inserted into or removed from the filling port unless the lock member is held in an unlocked state.

SUMMARY OF THE INVENTION

The present invention provides a filling port structure for a fuel tank that prevents an open/close valve from being unlocked due to pressing by a fuel gun with a diameter outside a specific range and prevents interference between a fuel gun that is inserted into or removed from the filling port and a locking member.

An aspect of the invention relates to a filling port structure for a fuel tank. The filling port structure includes a filling port member that defines a filling port into which a fuel gun for supplying fuel to a fuel tank is inserted; an open/close valve that opens and closes the filling port; a rotary member that attaches the openklose valve to the filling port member in a manner such that the open/close valve is rotatable between an open position to open the filling port and a closed position to close the filling port; a locking member that is provided in the filling port member and is movable between a locking position to lock the open/close valve in the closed position to prevent rotation of the open/close valve, and an unlocking position to unlock the open/close valve to allow the rotation of the open/close valve, wherein the locking member is located farther from a center line of the filling port member when in the unlocking position than when in the locking position; an unlocking member that moves the locking member from the locking position to the unlocking position when pressed by the fuel gun with a diameter in a specific range; and a retention portion that holds the locking member in the unlocking position at least when the open/close valve is in the open position.

In the filling port structure for a fuel tank, the open/close valve is rotatably attached to the filling port member by the rotary member. In a normal state, the filling port is closed by the open/close valve and the open/close valve is locked in the closed position by the locking member.

The locking member is movable between the locking position to lock the open/close valve in the closed position to prevent rotation of the open/close valve and the unlocking position to unlock the open/close valve to allow rotation of the open/close valve. The unlocking member moves the locking member to the unlocking position when pressed by the fuel gun with the diameter in the specific range. The locking member unlocks the open/lose valve to allow the open/close valve to rotate when in the unlocking position. Thus, when the open/close valve is pressed by the fuel gun in this state, the open/close valve is rotated and the filling port is opened. When the unlocking member is pressed by a fuel gun with a diameter outside the specific range, the locking member does not unlock the open/close valve and the open/close valve is not rotated. In other words, insertion of a fuel gun with a diameter outside the specific range can be prevented.

The filling port structure for a fuel tank also includes the retention portion. The retention portion holds the locking member in the unlocking position at least when the open/close valve is in the open position. The locking member according to the above aspect of the present invention is located farther from the center line of the filling port member when in the unlocking position than when in the locking position. Thus, the fuel gun is prevented from interfering with the locking member when inserted into or removed from the filling port.

In the above-described aspect of the invention, the retention portion may include a guide member which is located in a guiding position to guide the fuel gun toward the open/close valve when the fuel gun is inserted into the filling port and moves to a retracted position in accordance with movement of the open/close valve to the open position, and a retention member which is provided on the guide member and holds the locking member in the unlocking position by using movement of the guide member to the retracted position; and the guide member may be located farther from the fuel gun that is inserted into the filling port when in the retracted position than when in the guiding position.

In this configuration, when the fuel gun is inserted into the filling port, the guide member is in the guiding position and guides the fuel gun toward the open/close valve.

The guide member is configured to move to the retracted position as the open/close valve is moved to the open position. The guide member is located farther from the fuel gun that is inserted into the filling port when in the retracted position than when in the guiding position. In other words, when in the retracted position, the guide member is far from the fuel gun that is inserted into the filling port. Thus, the fuel gun is prevented from interfering with the guide member when inserted into or removed from the filling port.

The retention member is provided on the guide member. The retention member holds the locking member in the unlocking position by using the movement of the guide member to the retracted position. In other words, the movement of the guide member to the retracted position can be effectively used to hold the locking member in the unlocking position.

In the above-described aspect of the invention, the locking member may include paired lock levers, and each of the paired lock levers may include an engaging portion that is provided at one end of the lock lever and that is engageable with the open/close valve to lock the open/close valve, a contacted piece that is provided at another end of the lock lever, and a rotary support part that is provided at an intermediate portion of the lock lever and that is rotatably supported on the filling port member; and the retention members may extend from the guide member and may be in contact with the respective contacted pieces to hold the lock levers in the unlocking position when the guide member is located in the retracted position.

In this configuration, the lock levers are rotatable about rotary support parts that are provided at intermediate portions of the lock levers, between the locking position and the unlocking position. When the lock levers are in the locking position, the engaging portions at the one ends of the lock levers are engaged with the open/close valve to lock the movement of the open/close valve. When the guide member is in the retracted position, the retention members are in contact with the respective contacted pieces at the other ends of the lock levers to hold the lock levers in the unlocking position.

Because the paired lock levers are provided, the open/close valve can be held in the locked state more securely compared to the configuration in which only one lock lever is provided.

The retention members may include retaining faces that are contactable with the respective contacted pieces to hold the lock levers in the unlocking position, and tilted faces that are continuous with the retaining faces and are tilted to guide the respective contacted pieces onto the retaining faces in accordance with movement of the guide member to the retracted position.

In this configuration, the retaining faces are brought into contact with the contacted pieces to hold the lock levers in the unlocking position. Because the contacted pieces are guided onto the retaining faces by the tilted faces as the guide member is moved to the retracted position, the contacted pieces can be smoothly guided onto the retaining faces.

In the above aspect of the present invention, the open/close valve is prevented from being unlocked due to pressing by a fuel gun with a diameter outside a specific range, and the interference between a fuel gun that is inserted into or removed from the filling port and the locking member is prevented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 2A and 2B illustrate the filling port structure for a fuel tank according to the first embodiment of the present invention with the flap valve in the closed position, FIG. 2A being a front view and FIG. 2B being a sectional view that is taken along the line IIB-IIB of FIG. 2A;

FIGS. 8A to 8D are explanatory views that illustrate the change in relative positional relationship between contacted portions and the retention members in the filling port structure for a fuel tank according to the first embodiment of the present invention.

DETAILED DESCRIPTION OF EMBODIMENTS

Figure 1:
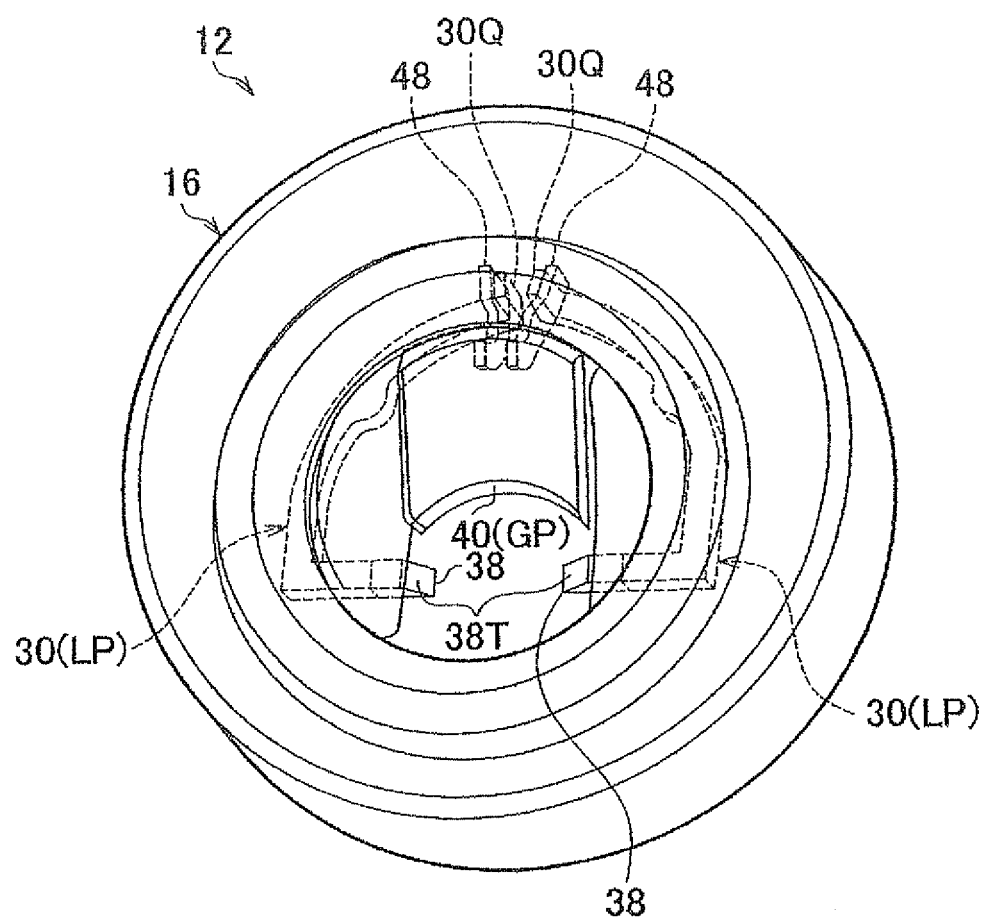
FIG. 1 is a perspective view that illustrates a filling port structure for a fuel tank according to a first embodiment of the present invention with a flap valve in a closed position as viewed from outside.

FIG. 1 illustrates the external appearance of a filling port structure 12 for a fuel tank (which is hereinafter referred to simply as "filling port structure 12") according to a first embodiment of the present invention. As can be understood from FIG. 1, a structure which does not require a cap that closes the filling port (so-called a capless structure) is adopted in this embodiment.

The lower end of an inlet pipe (not shown) is connected to a fuel tank (not shown). The filling port structure 12 is provided at an upper part of the inlet pipe. The fuel tank contains gasoline in this embodiment.

A filling port member 16 with a generally cylindrical shape is provided at an upper part of the inlet pipe. As shown also in FIG. 2B and so on, a filling port 26 is defined in the filling port member 16, and a fuel gun 28 can be inserted into the filling port 26 through an opening 18 at the upper end thereof to refill the fuel tank.

In the following, when the term "far side" is simply used, it refers to the side in the filling port member 16, which is close to the fuel tank (right side in FIG. 2B), and when the term "near side" is simply used, it refers to the opposite side, that is, the side from which the fuel gun 28 is inserted (left side in FIG. 2B). The term "radial direction" refers to a radial direction of the generally cylindrical filling port member 16.

A flap valve 20 is provided at an upper part of the filling port member 16, in other words, at the opening 18 of the filling port 26.

The flap valve 20 is rotatably attached to the filling port member 16 by a hinge 22 provided at an upper part of the flap valve 20. The flap valve 20 is rotatable between a closed position TP to close the filling port 26 (position indicated by solid lines) and an open position HP to open the filling port 26 (the position indicated by double-dot and dash lines). When the flap valve 20 is in the open position HP, a lower part of the flap valve 20, in other words, the side opposite the side on which the hinge 22 is located, has been largely moved to the far side (right side in FIG. 2B). A stopper (not shown) is provided on an interior surface of the filling port member 16 to limit the rotatable range (open position) of the flap valve 20 within a predetermined range.

Figure 3:
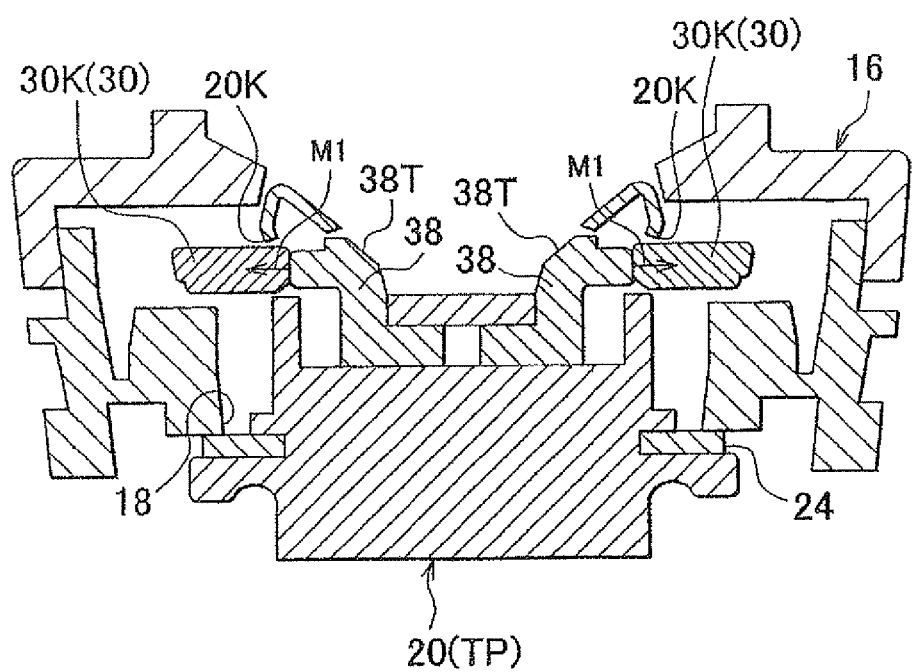
FIG. 3 is a sectional view that is taken along the line III-III of FIG. 2A and illustrates the filling port structure for a fuel tank according to the first embodiment of the present invention with the flap valve in a locked state.

The flap valve 20 has a diameter which is larger than that of the opening 18 as a whole. As shown in FIG. 3, an annular gasket 24 (not shown in FIGS. 2A and 2B and so on) is attached to an outer periphery of the flap valve 20 so that the flap valve 20 can be held in tight contact with the peripheral edge of the opening 18. When the flap valve 20 is in the closed position TP, the gasket 24 is in close contact with the peripheral edge of the opening 18 from inside of the filling port member 16 to close the opening 18 tightly.

A flap valve spring 36 (refer to FIG. 2B) is wound around the hinge 22. The flap valve spring 36 presses the flap valve 20 toward the closed position TP so that the filling port 26 cannot be opened accidentally. When the fuel gun 28 is inserted into the opening 18, the flap valve 20 is pressed by the fuel gun 28 and moves (rotates) to the open position HP against the pressing force of the flap valve spring 36.

As shown in FIG. 1 and FIG. 2A, paired lock levers 30 are attached to the filling port member 16. The lock levers 30 are curved to surround the opening 18 when the filling port member 16 is viewed from the front. The two lock levers 30 are located bilaterally symmetrically when the filling port member 16 is viewed from the front.

Figure 5:
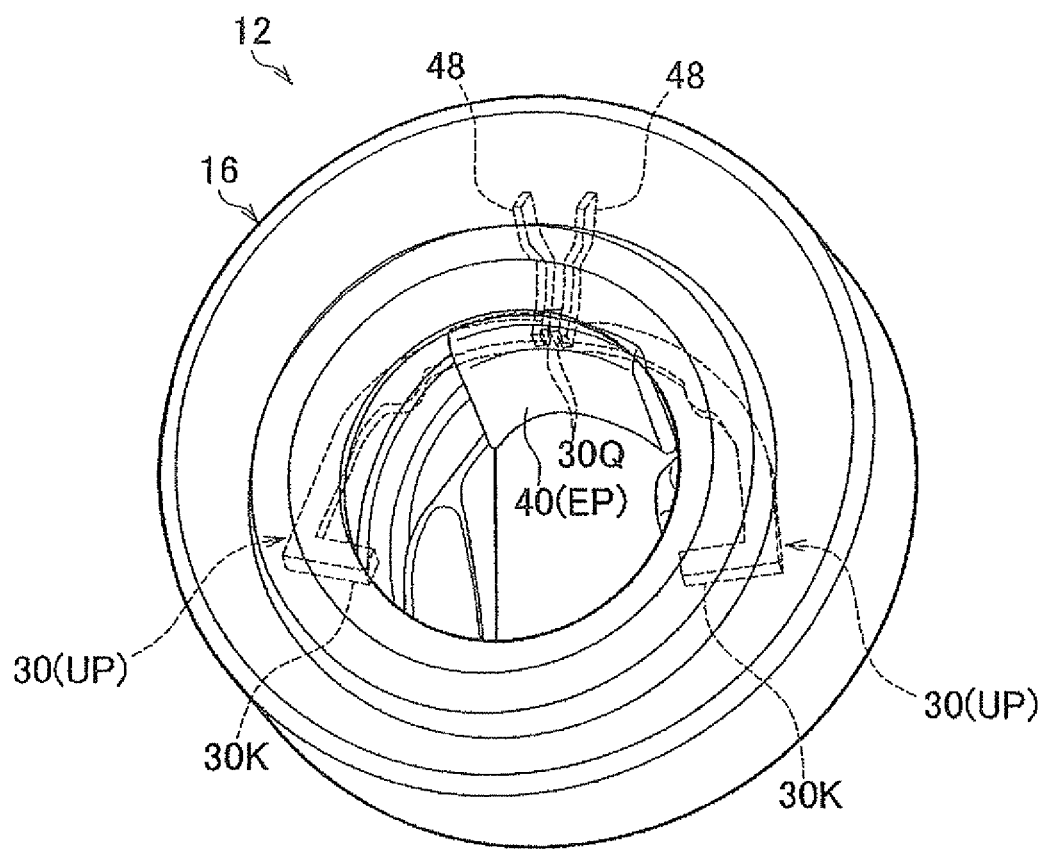
FIG. 5 is a perspective view that illustrates the filling port structure for a fuel tank according to the first embodiment of the present invention with the flap valve in an open position as viewed from outside.
Figure 6A:
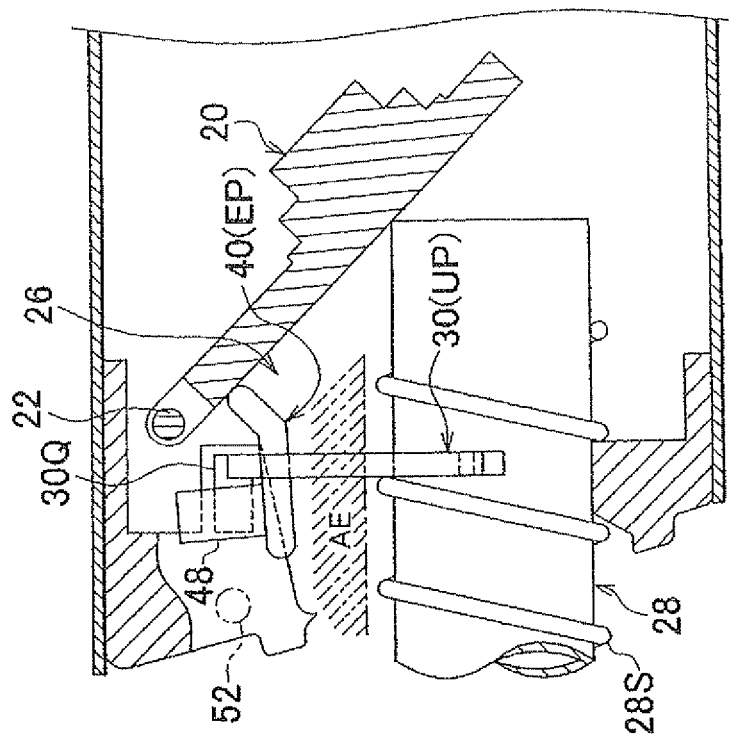
FIGS. 6A and 6B illustrate the filling port structure for a fuel tank according to the first embodiment of the present invention with the flap valve during rotation from the closed position to the open position, FIG. 6A being a front view and FIG. 6B being a sectional view that is taken along the line VIB-VIB of FIG. 6A.

A pivot shaft 30S is provided on a longitudinal middle portion of each lock lever 30. The pivot shaft 30S is one example of the rotary support part in the present invention, and the lock levers 30 are rotatably supported by the pivot shafts 30S relative to the filling port member 16 between a locking position LP that is shown in FIG. 1 and FIG. 2A and an unlocking position UP that is shown in FIG. 5 and FIG. 6A. A lock lever spring 32 is attached to the filling port member 16. The lock lever spring 32 presses each of the lock levers 30 toward the locking position LP.

Each lock lever 30 has an engaging portion 30K that extends from its lower end toward the center line CL1 of the filling port member 16 when the filling port member 16 is viewed from the front thereof. The engaging portions 30K are located close to the center line CL1 when the lock levers 30 are in the locking position LP. The engaging portions 30K are engaged respectively with engaged parts 20K that are provided on the flap valve 20 when the flap valve 20 is in the closed position TP. This engagement rotatably locks the flap valve 20 in the closed position TP. In particular, in this embodiment, the engaging portions 30K are located apart from the hinge 22. Thus, the flap valve 20 can be tightly held in a locked state compared to the configuration in which the engaging portions 30K are located close to the hinge 22.

On the other hand, the engaging portions 30K are located relatively farther from the center line CL1 when the lock levers 30 are in the unlocking position UP (than when the lock levers 30 are in the locking position LP).

Each lock lever 30 has a contacted portion (contacted piece) 30Q that extends upward and toward the near side from its upper end. The contacted portions 30Q are located apart from each other when the lock levers 30 are in the locking position LP, and are located close to each other when the lock levers 30 are in the unlocking position UP. The contacted portions 30Q are respectively held in contact with retaining faces 48H of retention members 48 to hold the lock levers 30 in the unlocking position UP as described later.

Paired unlocking pieces 38 are provided in the flap valve 20. The paired unlocking pieces 38 are opposed to the engaging portions 30K of the lock levers 30 in a lateral direction of FIG. 2A. Each unlocking piece 38 is supported by a support member (not shown) in a manner such that the unlocking piece 38 is movable to the right and left in FIG. 2A. In particular, when the unlocking pieces 38 are moved in the direction of arrows M1 in FIG. 3 (away from each other), the unlocking pieces 38 press the engaging portions 30K of the lock levers 30 to rotate the lock levers 30 from the locking position LP to the unlocking position UP.

As shown also in FIG. 1, each unlocking piece 38 has a tapered face 38T on its near side. The distance between the two tapered faces 38T is suited for a fuel gun for a fuel that should be supplied to the fuel tank (appropriate fuel). Thus, when a fuel gun for an appropriate fuel is pressed toward the inside of the filling port 26 with its end in contact with the tapered faces 38T, the unlocking pieces 38 are moved in the direction of arrows M1 (refer to FIG. 3). As a result, the lock levers 30 are moved from the locking position LP to the unlocking position UP. On the contrary, a fuel gun for a fuel that should not be supplied to the fuel tank (inappropriate fuel) does not contact the tapered faces 38T (a fuel gun for an inappropriate fuel may contact one of the tapered faces 38T but does not contact both the tapered faces 38T simultaneously), and at least one of the lock levers 30 are held in the locking position LP.

As shown also in FIG. 2B, in the filling port member 16, a guide member 40 is provided above an insertion region SE through which the fuel gun 28 for an appropriate fuel is brought into contact with the flap valve 20. Guide pieces 42 are provided on right and left sides of the guide member 40. Each of the guide member 40 and the guide pieces 42 has a tilted guide face 40G on its near side, which guides the fuel gun 28 into the insertion region SE when the fuel gun 28 is not inserted properly into the insertion region SE toward the filling port 26.

In particular, the guide member 40 is bent at an obtuse angle at a point between its one end 40A and another end 40C to form a bent portion 40B. The part of the guide member 40 on the one end 40A side from the bent portion 40B has the tilted guide face 40G, which guides the fuel gun 28 toward the flap valve 20. The part of the guide member 40 on the other end 40C side has a movement restricting face 40I, that restricts the movement of the fuel gun 28 in a vertical direction (direction perpendicular to the arrow A1 in FIG. 2B) after the fuel gun 28 has been placed against the flap valve 20.

In the filling port member 16, a pivot shaft 52 that extends parallel to the hinge 22 is provided at a location above and on the near side of the guide member 40. The guide member 40 is rotatably attached at a part near the one end 40A (the near side end) to the filling port member 16 using the pivot shaft 52.

A guide member spring 54 is attached to the pivot shaft 52. The guide member spring 54 presses the guide member 40 to urge the other end 40C upward. The other end 40C of the guide member 40 is always held in contact with the flap valve 20 by the pressing force of the guide member spring 54. At this time, as can be understood from comparison between FIG. 2B and FIG. 6B, the position where the other end 40C contacts the flap valve 20 moves (slides) upward (toward the hinge 22) as the flap valve 20 rotates from the closed position TP to the open position HP.

Figure 6B:
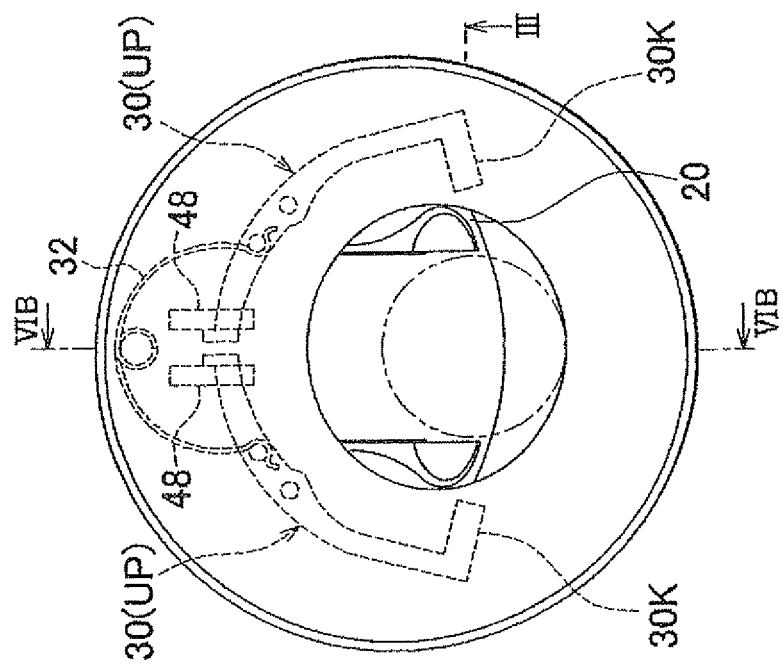
Figure 7:
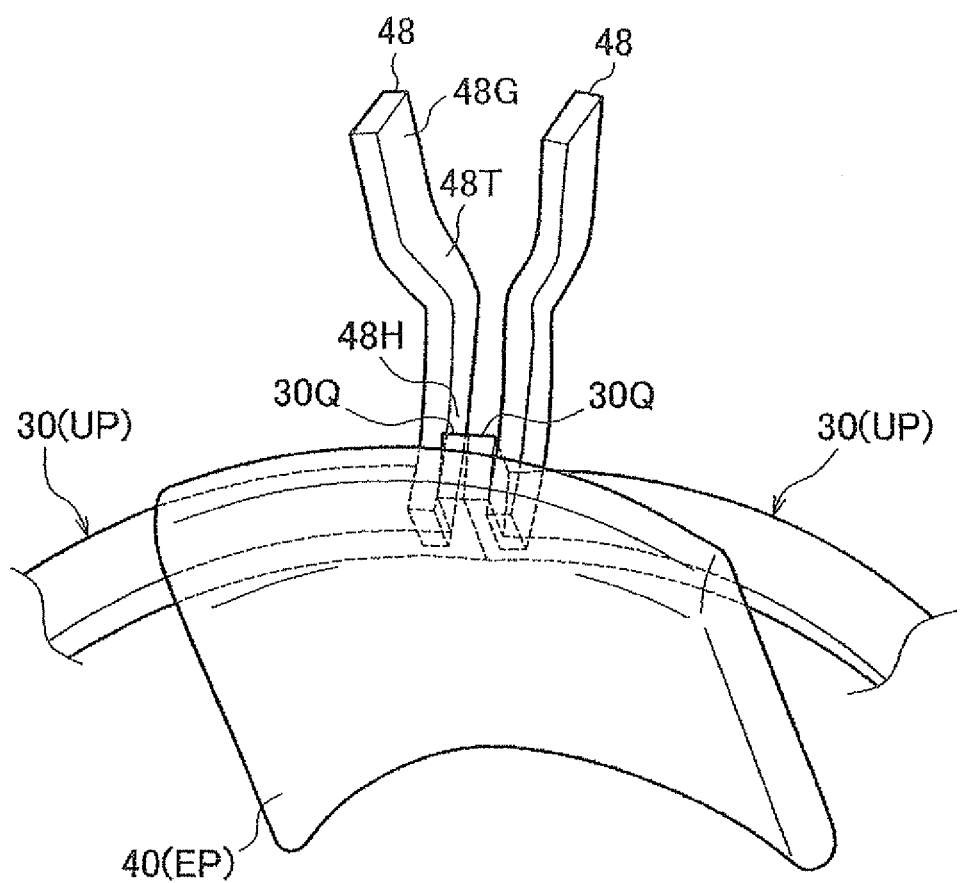
FIG. 7 is an enlarged perspective view that illustrates the retention members and portions near the retention members in the filling port structure for a fuel tank according to the first embodiment of the present invention with the lock levers in an unlocking position.

The guide member 40 is rotated from a guiding position GP that is shown in FIG. 2B to a retracted position EP that is shown in FIG. 6B by the pressing force of the guide member spring 54 as the flap valve 20 rotates from the closed position TP to the open position HP.

When the guide member 40 is in the guiding position GP, the tilted guide face 40G of the guide member 40 is tilted toward the center of the filling port 26. The tilted guide face 40G guides the fuel gun 28 toward the flap valve 20, which closes the filling port 26, when the fuel gun 28 is inserted into the filling port 26 and the end of the fuel gun 28 contacts the tilted guide face 40G.

On the other hand, when the guide member 40 is in the retracted position EP, the entire guide member 40 is in a retraction region AE which is retracted from the insertion region SE for the fuel gun 28 as can be understood from FIG. 6B. Thus, when the fuel gun 28 is inserted into the filling port 26, the fuel gun 28 and the guide member 40 do not interfere with each other.

As shown in detail also in FIG. 1 and FIG. 5, paired retention members 48 are provided on the reverse face of the guide member 40 (the face on the far side when the guide member 40 is in the guiding position GP). The retention members 48 are symmetrical with respect to the center line CL1. As shown in detail also in FIGS. 8A to 8D, a retaining face 48H, a tilted face 48T and an introducing face 48O are formed, in this order from the bottom (the side close to the guide member 40), on each of opposing faces of the retention members 48.

When the flap valve 20 is in the closed position TP, the guide member 40 is also in the guiding position GP. When the fuel gun 28 has not reached the tapered faces 38T of the unlocking pieces 38, the lock levers 30 are in the locking position LP as shown in FIG. 2A, and the contacted portions 30Q at the upper ends of the lock levers 30 are apart from each other. As shown also in FIG. 8A, each contacted portion 30Q is in contact with the corresponding introducing face 48O or opposed to the corresponding introducing face 48G with a small gap therebetween. In other words, the introducing faces 48O are positioned so as to have such a positional relationship with the contacted portions 30Q.

The retention members 48 are positioned such that the retaining faces 48H are in contact with the contacted portions 30Q to hold the contacted portions 30Q close to each other in order to hold the lock levers 30 in the unlocking position when the guide member 40 is in the retracted position EP as shown in FIG. 6B (refer to FIG. 8D). When the retention members 48 are relatively moved upward as the guide member 40 is moved from the guiding position GP toward the retracted position EP, the tilted faces 48T are brought into contact with the contacted portions 30Q and guide the contacted portions 30Q onto the retaining faces 48H (refer to FIGS. 8B to 8D). The distance between the tilted faces 48T gradually decreases in the direction from the introducing faces 48O to the retaining faces 48H.

The guide member 40 and the retention members 48 constitute the retention portion of the present invention.

The advantageous effect of the filling port structure 12 of this embodiment is next described below.

In a normal state, the engaging portions 30K are engaged with the engaged parts 20K of the flap valve as shown in FIG. 2A because the lock levers 30 are held in the locking position LP by the pressing force of the lock lever spring 32. Thus, the flap valve 20 is locked in the closed position TP and cannot be rotated accidentally.

Figure 4:
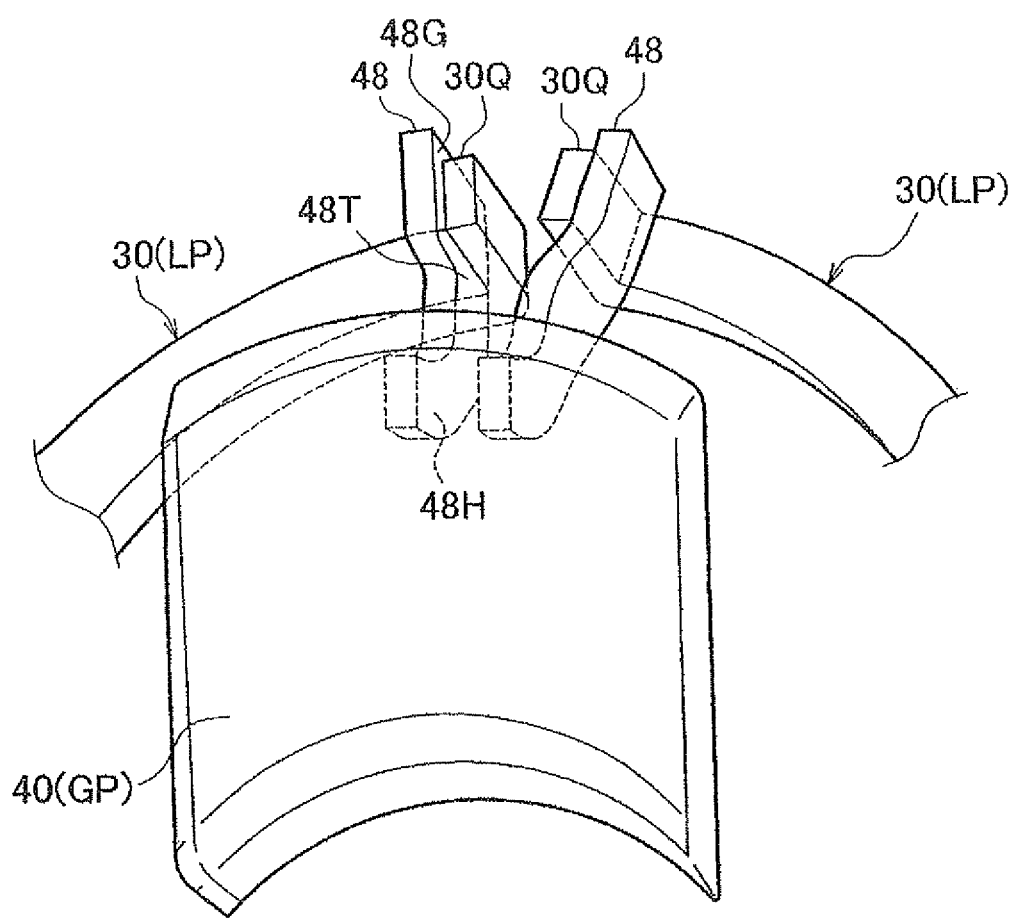
FIG. 4 is an enlarged perspective view that illustrates retention members and portions near the retention members in the filling port structure for a fuel tank according to the first embodiment of the present invention with lock levers in a locking position.

At this time, the lock levers 30 are in the locking position. As shown in FIG. 4 and FIG. 8A, the contacted portions 30Q at the upper ends of the lock levers 30 are apart from each other and are in contact with the corresponding introducing faces 48G or opposed to the corresponding introducing faces 48G with a small gap therebetween.

If fuel is about to be supplied from a fuel gun for an inappropriate fuel, the fuel gun for an inappropriate fuel does not contact the tapered faces 38T of the two unlocking pieces 38 simultaneously. The unlocking pieces 38 are not moved to the unlocking position, and the lock levers 30 are also held in the locking position LP. Because the flap valve 20 is held in the locked state, the flap valve 20 cannot be rotated from the closed position. In other words, the fuel gun for an inappropriate fuel cannot be inserted into the filling port 26, and so-called misfueling is prevented.

In contrast, when fuel is supplied from a fuel gun for an appropriate fuel, the end of the fuel gun 28 contacts the tapered faces 38T of the unlocking pieces 38 simultaneously, and the unlocking pieces 38 are moved away from each other (the directions of arrows M1 in FIG. 3) by further moving the fuel gun 28 to the far side. As a result, the lock levers 30 are moved to the unlocking position UP. The contacted portions 30Q of the lock levers 30 are moved toward each other (refer to FIG. 8B).

Because the movement of the lock levers 30 to the unlocking position UP unlocks the flap valve 20, the flap valve 20 can be moved to the open position HP by further inserting the fuel gun 28 into the filling port 26. Then, the fuel gun 28 can be inserted to a prescribed position in the filling port 26 to refill the fuel tank.

As the flap valve 20 is moved to the open position HP, the guide member 40 is moved to the retracted position EP as shown in FIG. 6B by the pressing force of the guide member spring 54. The retention members 48 move upwards along with the movement of the guide member 40.

At this time, the contacted portions 30Q may temporarily tend to move away from each other, but the tilted faces 48T of the retention members 48, which are moving upward, are brought into contact with the contacted portions 30Q. When the tilted faces 48T further move upward, the contacted portions 30Q are guided in a direction toward each other by the tilted faces 48T (refer to FIG. 8C).

Then, when the guide member 40 reaches the retracted position EP, the contacted portions 30Q of the lock levers 30 are brought into contact with the retaining faces 4814 and held close to each other (refer to FIG. 8D). As a result, the paired lock levers 30 are both held in the unlocking position UP.

When the lock levers 30 are in the unlocking position UP, the engaging portions 30K of the lock levers 30 are located in the retraction region AE, in other words, outside the region through which the fuel gun 28 is insert into the filling port 26. Thus, when the fuel gun 28 is inserted into the filling port 26, the fuel gun 28 can be smoothly inserted without interference with the lock levers 30.

When the fuel gun 28 is removed from the filling port 26, the flap valve 20 is in the open position HP, or the flap valve 20 is somewhere between the open position HP and the closed position TP, and the guide member 40 is in the retracted position EP as can be understood from FIG. 6B. Thus, the retaining faces 48H of the retention members 48 are in contact with the contacted portions 30Q of the lock levers 30 and the lock levers 30 are held in the unlocking position UP (refer to FIG. 6A). Because the engaging portions 30K of the lock levers 30 do not interfere with the fuel gun 28, the fuel gun 28 can be smoothly removed from the filling port 26.

When the fuel gun 28 is completely removed from the filling port 26, the flap valve 20 has returned to the closed position TP and the guide member 40 has returned to the guiding position GP as shown in FIG. 2B. The contacted portions 30Q of the lock levers 30 are opposed to (or in contact with) the introducing faces 48G of the retention members 48 (refer to FIG. 2A and FIG. 8A). In other words, the lock levers 30 have been returned to the locking position LP by the pressing force of the lock lever spring 32 and the flap valve 20 has been locked again in the closed position TP.

As can be understood from the above description, in the filling port structure 12 of this embodiment, because the lock levers 30 (locking members) are retracted from the insertion region SE for the fuel gun 28 and located in the retraction region AE when the fuel gun 28 is inserted into or removed from the filling port 26, the lock levers 30 and the fuel gun 28 do not interfere with each other, allowing smooth insertion and removal of the fuel gun 28.

In particular, when a fuel gun, which includes a coil-shaped fuel gun spring 28S wound around an outer periphery of the end thereof as shown in FIG. 6B, is used as the fuel gun 28, and the fuel gun 28 is inserted into or removed from the filling port 26, the spring may be caught by the lock lever 30 and interfere with insertion and removal of the fuel gun 28 if the lock levers 30 are partially located in the insertion region SE for the fuel gun. The filling port structure 12 of this embodiment allows smooth insertion and removal of the fuel gun 28 because the lock levers 30 are held in the unlocking position UP and there is a low possibility of the engaging portions 30K interfering with the spring of the fuel gun when the fuel gun 28 is inserted into or removed from the filling port 26.

While the guide member 40 which has a function of guiding the fuel gun 28 toward the flap valve 20 is shown in the above embodiment as a "guide member" of the present invention, the "guide member" is not limited to the guide member 40 in view of the principle of the present invention. In other words, any member that moves into the retraction region AE as the flap valve 20 is moved from the closed position TP to the open position HP does not interfere with the insertion and removal of the fuel gun 28, and the retention members can hold the lock levers 30 in the unlocking position by using the movement of the member.

While the members (lock levers 30) that are rotatably attached at their intermediate portions to the filling port member 16 by the pivot shafts 30S are shown in the above embodiment as the locking member of the present invention, the locking member has only to be attached to the filling port member 16 and movable between a locking position to lock the flap valve 20 in the closed position and an unlocking position to unlock the flap valve 20. For example, a slidable lock member which is slidable between a locking position and an unlocking position may be used.

While the unlocking pieces 38 that are provided on the flap valve 20 are shown in the above embodiment as the unlocking member of the present invention, the unlocking member has only to be able to move the lock lever 30 (locking member) from the locking position LP to the unlocking position UP when pressed by the fuel gun 28 with a diameter in a specific range. For example, the unlocking member may be constituted by tapered faces that are formed at ends of the engaging portions 30K of the lock levers 30 and can rotate the lock levers 30 to the unlocking position UP when pressed by the fuel gun 28. In this case, the unlocking pieces 38 of the flap valve 20 may be omitted to reduce the number of parts.

When the unlocking member is provided separately from the locking member as in the above embodiment, the limitation on the shape of the tapered faces 38T and the displacement of the unlocking pieces 38 can be reduced and operability in unlocking can be improved.

While an example in which the retention portion of the present invention is constituted by the guide member 40 and the retention members 48 is shown in the above embodiment, a movable member which moves as the flap valve 20 is moved from the closed position TP to the open position HP (and which does not have the function of guiding the fuel gun 28) may be provided instead of the guide member 40 and the retention members 48 may be attached to the movable member.

What is claimed is:

1. A filling port structure for a fuel tank, comprising:
a filling port member that defines a filling port into which a fuel gun for supplying fuel to a fuel tank is inserted;
an open/close valve that opens and closes the filling port;
a rotary member that attaches the open/close valve to the filling port member in a manner such that the open/close valve is rotatable between an open position to open the filling port and a closed position to close the filling port;
a locking member that is provided in the filling port member and is movable between a locking position to lock the open/close valve in the closed position to prevent rotation of the open/close valve, and an unlocking position to unlock the open/close valve to allow the rotation of the open/close valve, wherein the locking member is located farther from a center line of the filling port member when in the unlocking position than when in the locking position;
an unlocking member that moves the locking member from the locking position to the unlocking position when pressed by the fuel gun with a diameter in a specific range; and
a retention portion that holds the locking member in the unlocking position at least when the open/close valve is in the open position,
wherein the retention portion includes a guide member which is located in a guiding position to guide the fuel gun toward the open/close valve when the fuel gun is inserted into the filling port and moves to a retracted position in accordance with movement of the open/close valve to the open position, and a retention member which is provided on the guide member and holds the locking member in the unlocking position by using movement of the guide member to the retracted position, and
wherein the guide member is located farther from the fuel gun that is inserted into the filling port when in the retracted position than when in the guiding position.

2. The filling port structure for a fuel tank according to claim 1,
wherein the locking member includes paired lock levers, and each of the paired lock levers includes an engaging portion that is provided at one end of the lock lever and that is engageable with the open/close valve to lock the open/close valve, a contacted piece that is provided at another end of the lock lever, and a rotary support part that is provided at an intermediate portion of the lock lever and that is rotatably supported on the filling port member; and
wherein the retention members extend from the guide member and are in contact with the respective contacted pieces to hold the lock levers in the unlocking position when the guide member is located in the retracted position.

3. The filling port structure for a fuel tank according to claim 2, wherein the unlocking member includes paired unlocking pieces, and when the paired unlocking pieces are pressed by the fuel gun with the diameter within the specific range, the paired unlocking pieces move away from each other and press the engaging portions of the lock levers to move the lock levers from the locking position to the unlocking position.

4. The filling port structure for a fuel tank according to claim 2, wherein the retention members include retaining faces that are contactable with the respective contacted pieces to hold the lock levers in the unlocking position, and tilted faces that are continuous with the retaining faces and are tilted to guide the respective contacted pieces onto the retaining faces in accordance with movement of the guide member to the retracted position.

5. The filling port structure for a fuel tank according to claim 4,
wherein the retention members are symmetrical with respect to the center line, and the retention members further include introducing faces which are opposed to the respective contacted pieces when the lock levers are in the locking position; and
wherein a distance between the tilted faces gradually decreases in a direction from the introducing faces to the retaining faces.

6. The filling port structure for a fuel tank according to claim 4, wherein the retention members move upward and the tilted faces are brought into contact with the contacted pieces to guide the contacted pieces onto the retaining faces as the guide member moves toward the retracted position.

* * * * *